No. 693,274. Patented Feb. 11, 1902.
W. McA. JOHNSON.
VOLTAIC CELL.
(Application filed Mar. 30, 1901.)

(No Model.)

WITNESSES:
G. T. Hackley.
N. S. Allyn

INVENTOR
Woolsey McA. Johnson.
BY
ATTORNEY

UNITED STATES PATENT OFFICE.

WOOLSEY McALPINE JOHNSON, OF CAMBRIDGE, MASSACHUSETTS, ASSIGNOR OF ONE-FOURTH TO CHARLES FREDERICK JOHNSON, OF HARTFORD, CONNECTICUT.

VOLTAIC CELL.

SPECIFICATION forming part of Letters Patent No. 693,274, dated February 11, 1902.

Application filed March 30, 1901. Serial No. 53,600. (No model.)

*To all whom it may concern:*

Be it known that I, WOOLSEY MCALPINE JOHNSON, a citizen of the United States, residing at Cambridge, Massachusetts, have invented certain new and useful Improvements in Voltaic Cells, of which the following is a full, clear, and exact description.

My improvement relates to voltaic cells, and has for its object to provide a cell having an improved advantageous construction and operation, as hereinafter pointed out.

The objects of my improvements are to reduce the cost of manufacture and increase the capacity and the life of cells employing an alkaline solution as the electrolyte.

The structural features of my improved cell are shown in the accompanying drawings, in which—

Figure 1:
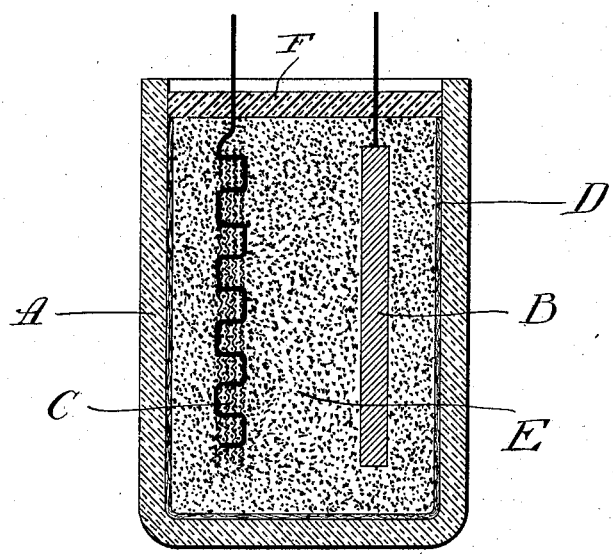
Figure 2:
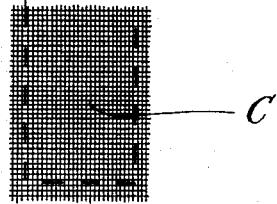

Figure 1 illustrates the cell complete, and Fig. 2 one of the electrodes of the same on a reduced scale.

The cell shown is what is known as a "dry" cell, and that is the preferred form in which I have embodied my invention.

Referring particularly to the drawings, A represents the outer receptacle of the cell, being of glass or porcelain, coated on the inside with paraffin D or any similar protecting material to prevent the electrolyte from attacking it.

B is an electrode, of zinc, of suitable form.

C represents an electrode, of electrolytically or chemically oxidized woven copper gauze, forming the other electrode.

E represents the electrolyte with any suitable absorbent material, such as sawdust.

F is a covering of a suitable substance by which I prefer to hermetically seal the cell.

The electrolyte is composed of an alkaline solution, such as potassium hydrate, and a salt capable of forming a double salt with zinc, such as potassium cyanid, the action of which will be further set forth hereinafter. One of the principal advantages of the oxidized copper gauze electrode consists in the fact that by reason of its form it has a very large surface exposed to the electrolyte as compared with the quantity of material used, and thus contributes to the efficiency and reduction in cost of the battery. In making it I take a number of sheets of copper gauze made out of closely-woven fine copper wire and thread through them a larger copper wire to form a support and to provide electrical connection to the proper terminal. I then subject them to electrolytic action until they are largely converted into copper oxid, after which they are ready for use in the voltaic cell.

Heretofore it has been common to use in batteries having electrodes of zinc and copper oxid an alkaline solution, such as potassium hydrate. When, however, such a cell is upon a closed circuit, the zinc goes into solution, displacing the hydrogen of the hydrate and forming potassium zincate. The hydrogen thus displaced reduces the copper oxid. Such action causes the depletion of the alkali. I have discovered that this depletion of the alkali can be largely prevented by the use of potassium cyanid or an equivalent substance which is capable of increasing the ability of the solution to dissolve zinc without increasing its corrosive action. This power is caused by the fact that patassium cyanid forms with zinc a soluble double salt, thus freeing the solution of the zincate and preventing the otherwise consequent clogging of the cell thereby. I have therefore formed my electrolyte of the alkaline solution and potassium cyanid and by this means preserved the activity of the alkali and prolonged the utility of the battery. I have found it possible to obtain similar results with sodium hyposulfite and also ammonium chlorid, and I believe that they can be obtained with any salt which will act upon the zincate to form a soluble or slightly-soluble double salt without interfering to too great an extent with the alkali.

What I claim is—

1. In a dry cell having an alkaline electrolyte, a zinc electrode, a salt which forms with zinc a soluble double salt in alkaline solution and an electrode of oxidized copper gauze.

2. A dry cell having an alkaline electrolyte, a zinc electrode, a salt which forms with zinc, a soluble double salt in alkaline solution and an electrode consisting of several layers of oxidized copper gauze.

3. A voltaic cell comprising an electrode of zinc B, an electrode of oxidized copper gauze C, an alkaline electrolyte, the said cell being hermetically sealed, substantially as shown and described.

Signed at Cambridge, Massachusetts, this 28th day of March, 1901.

WOOLSEY McALPINE JOHNSON.

Witnesses:
JOHN AMEE,
E. N. McLEAN.